Mar. 3, 1925.
J. W. CRUIKSHANK
1,528,531
POT FILLING APPARATUS
Filed Nov. 27, 1923
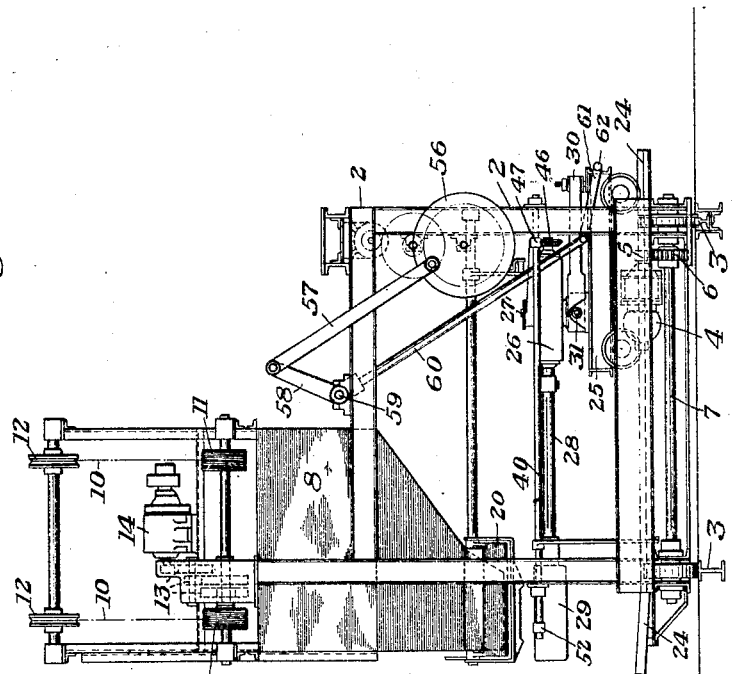
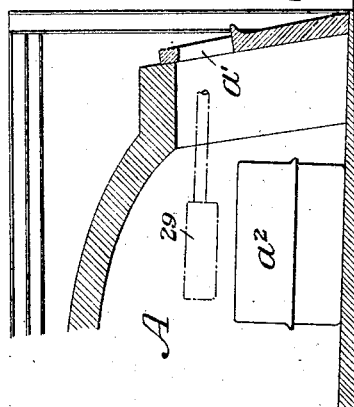
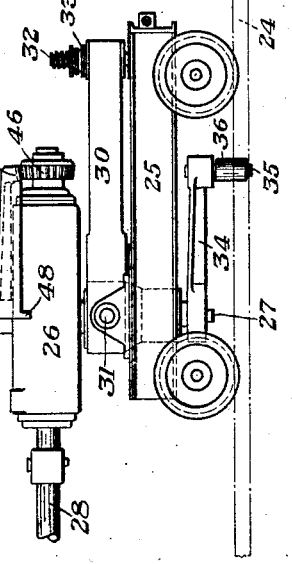
INVENTOR Mar. 3, 1925.
J. W. CRUIKSHANK
1,528,531
POT FILLING APPARATUS
Filed Nov. 27, 1923    6 Sheets-Sheet 2
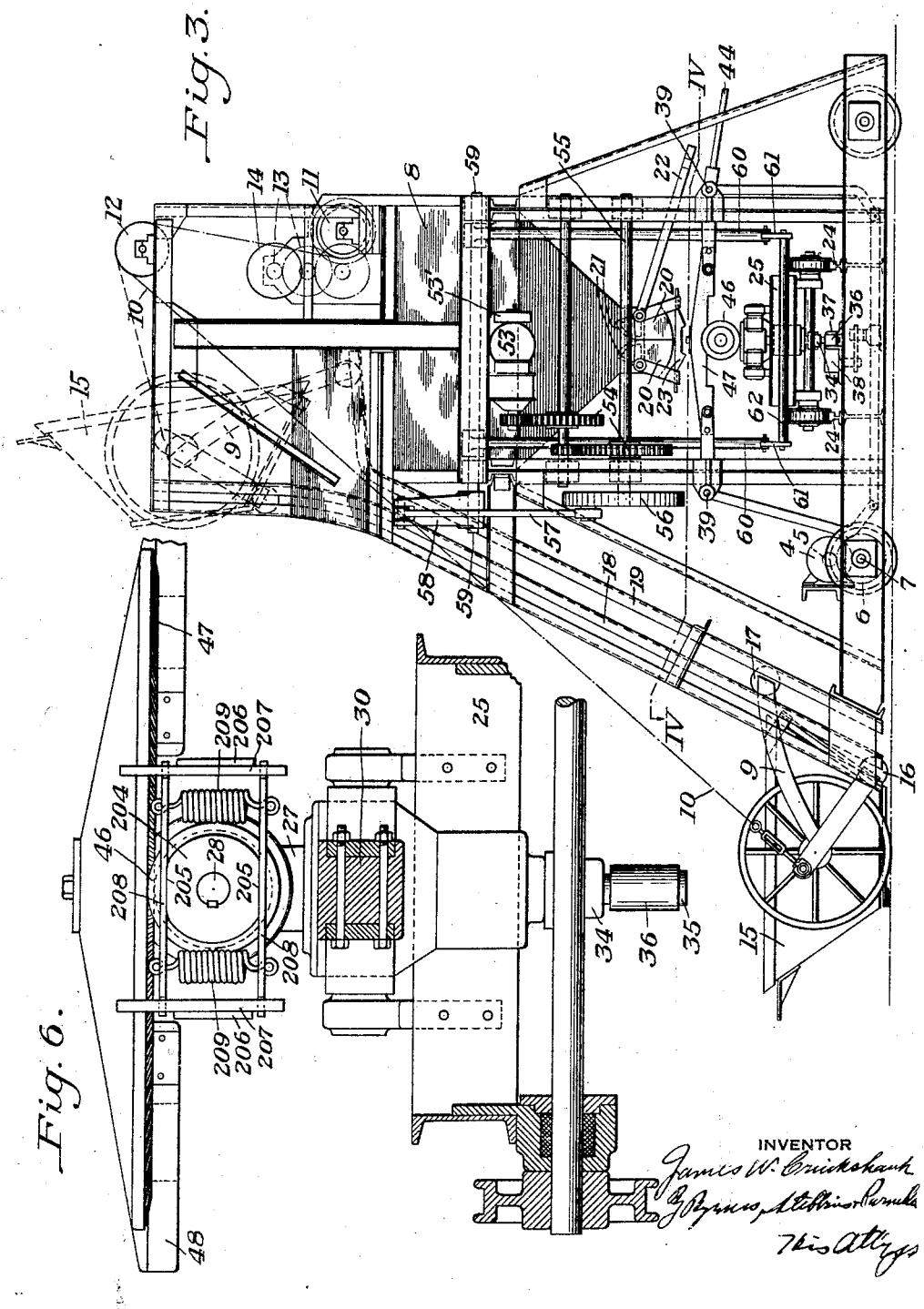

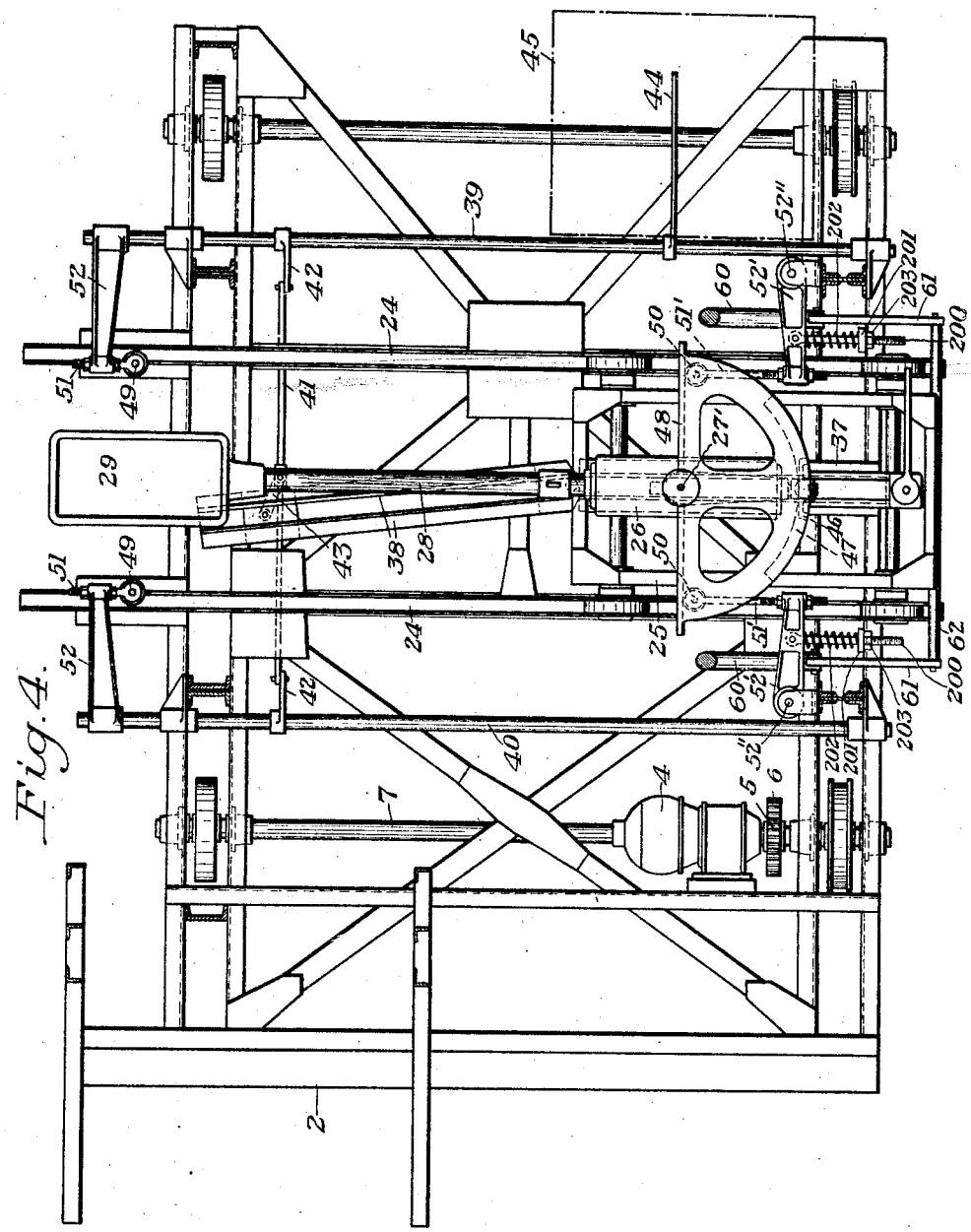

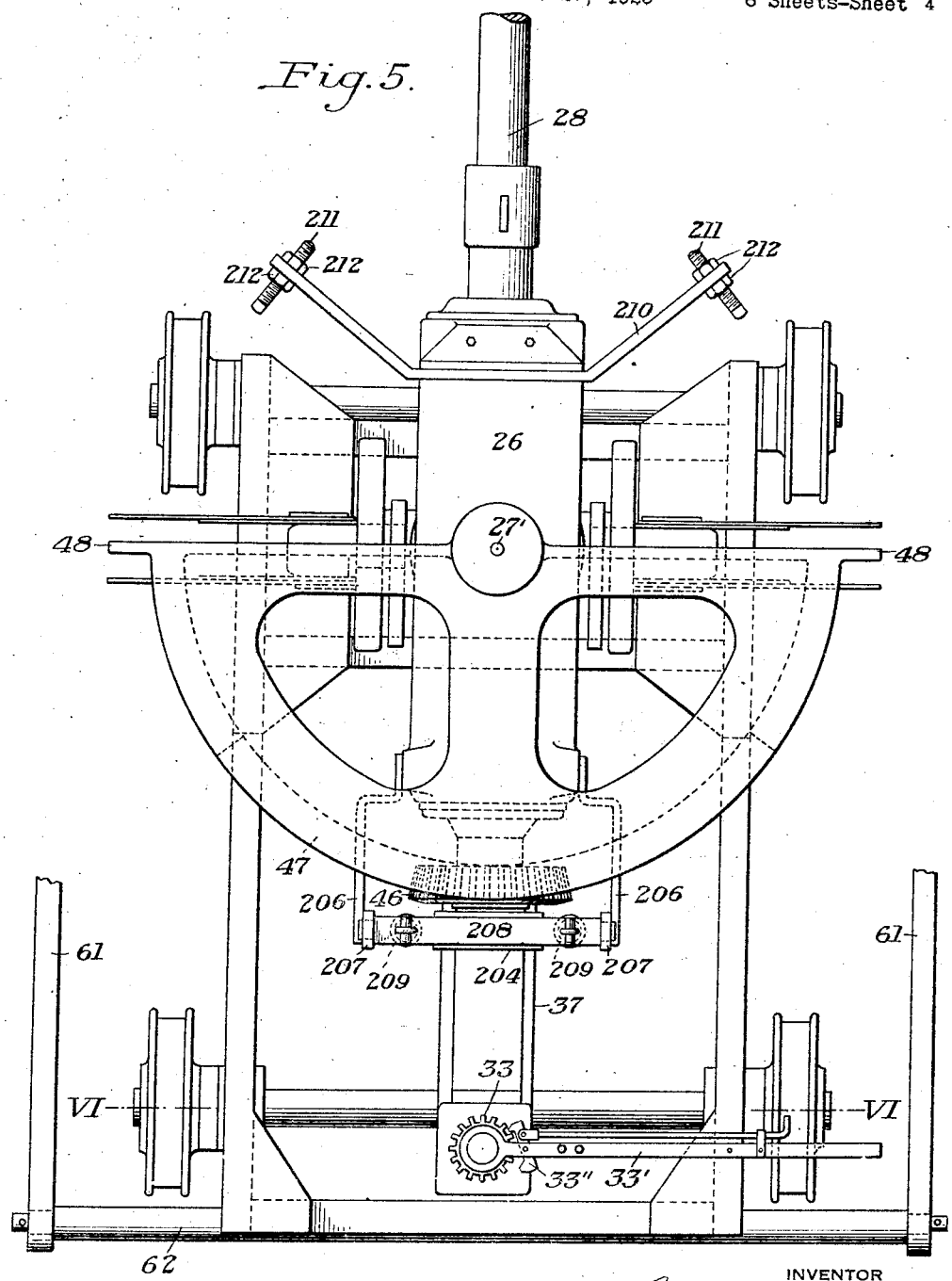

Mar. 3, 1925.
J. W. CRUIKSHANK
POT FILLING APPARATUS
Filed Nov. 27, 1923
1,528,531
6 Sheets-Sheet 5
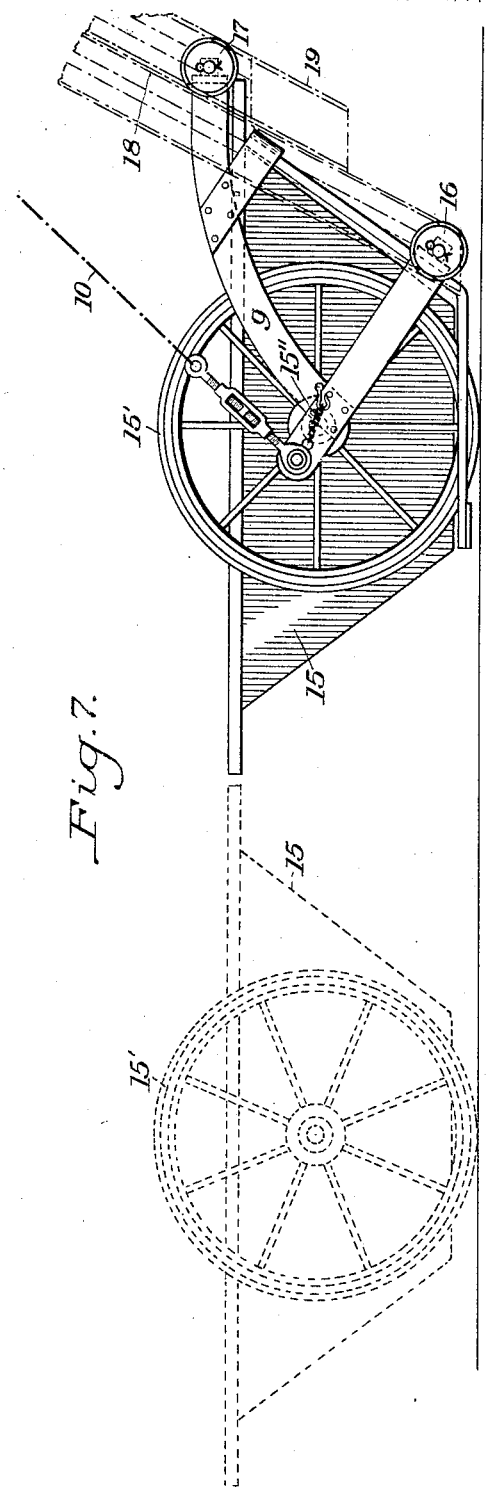
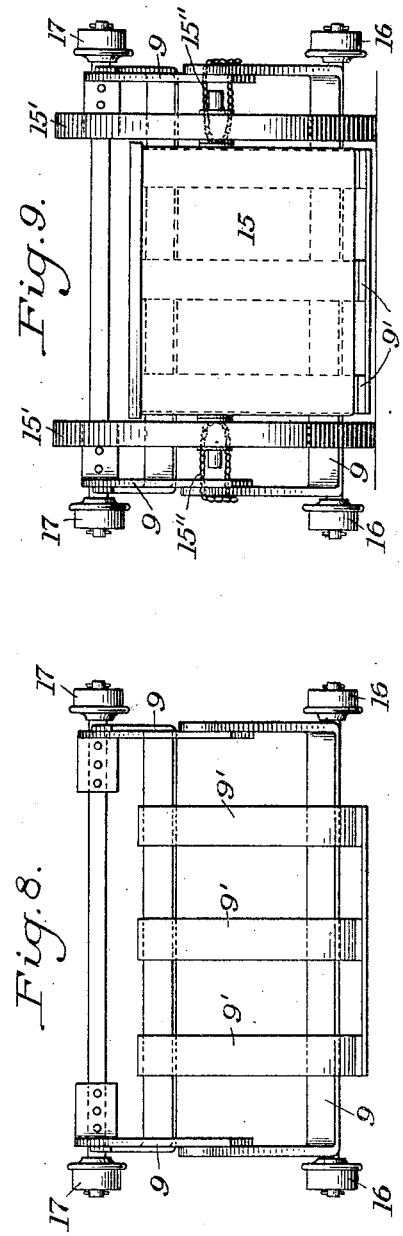

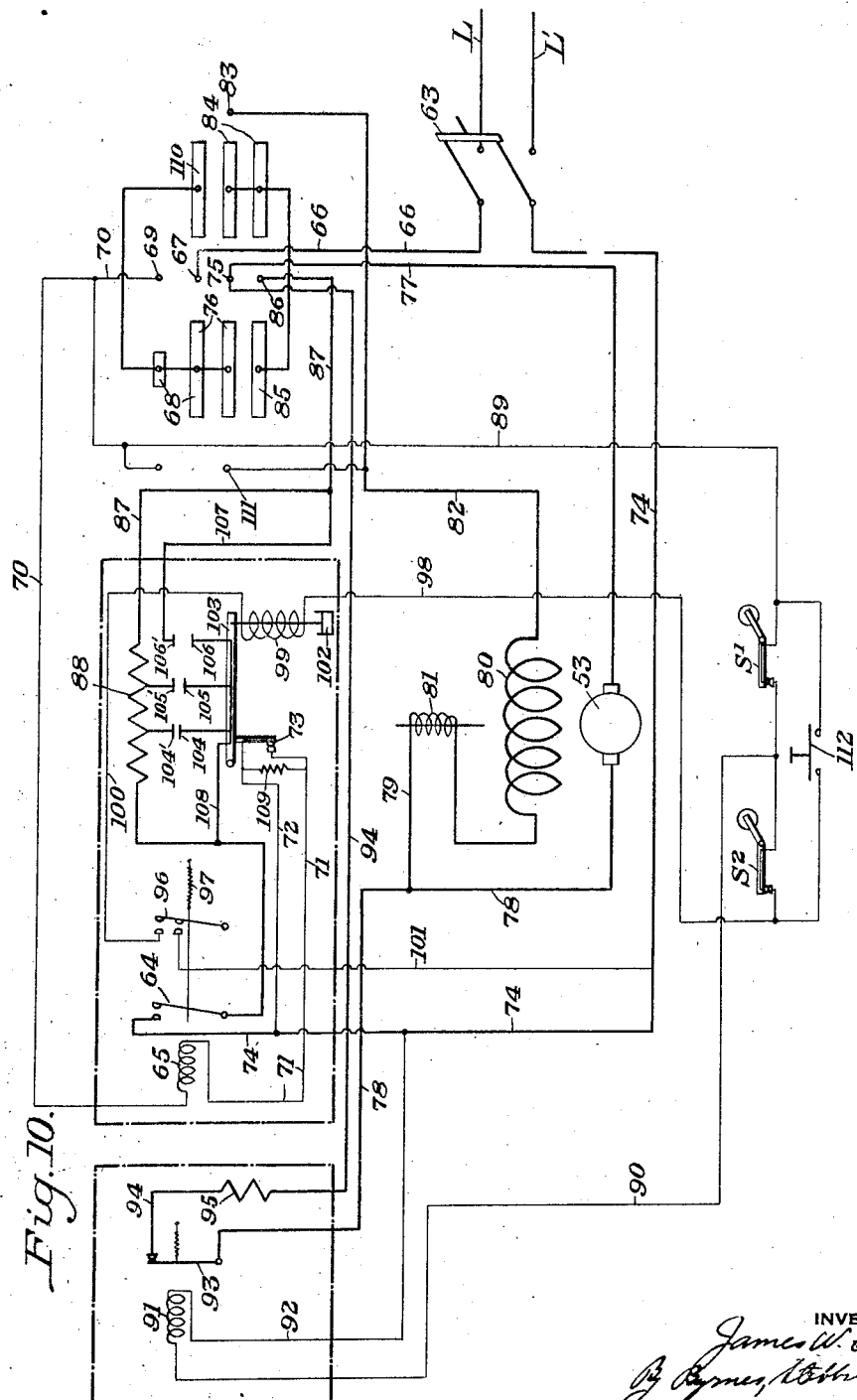

Patented Mar. 3, 1925.

1,528,531

UNITED STATES PATENT OFFICE.

JAMES W. CRUIKSHANK, OF PITTSBURGH, PENNSYLVANIA.

POT-FILLING APPARATUS.

Application filed November 27, 1923. Serial No. 677,240.

*To all whom it may concern:*

Be it known that I, JAMES W. CRUIKSHANK, a citizen of the United States, residing at Pittsburgh, in the county of Allegheny and State of Pennsylvania, have invented a new and useful Improvement in Pot-Filling Apparatus, of which the following is a full, clear, and exact description.

The present invention relates broadly to furnace charging apparatus and more particularly to apparatus for filling the pots of glass melting furnaces.

In the accompanying drawings there is shown, for purposes of illustration only, one embodiment of the present invention, it being understood that the drawings do not define the limits of the invention, as changes may be made in the construction and operation therein disclosed without departing from the spirit of the invention or scope of my broader claims.

In the drawings—

Figure 1 is a view of the apparatus in side elevation, showing it in operative position with relation to a furnace, the latter being shown in section;

Figure 2 is an enlarged side elevation of the trolley.

Figure 3 is a view of the apparatus in end elevation;

Figure 4 is a horizontal sectional view on the line IV—IV of Figure 3, showing on an enlarged scale a plan view of the trolley and parts carried thereby and of the lower portion of the bridge;

Figure 5 is a plan view, on an enlarged scale, of the trolley and associated parts;

Figure 6 is a sectional view on the line VI—VI of Figure 5;

Figure 7 is a detail view showing a side elevation of the skip car and of a batch container positioned therein and also showing a batch container in dotted outline in front of the skip car;

Figure 8 is a front elevation of the skip car;

Figure 9 is a view corresponding to Figure 8, showing a batch container positioned in the skip car; and Figure 10 is a wiring diagram showing the electrical connections for the motor which operates the trolley.

In the illustrative embodiment of the invention there is shown a traveling bridge 2 supported upon ground rails 3 and moved, as desired, from one furnace opening to another of a series of furnaces such as is shown in my Patent No. 1,204,252, of November 7, 1916, by an electric motor 4 whose armature shaft carries a pinion 5 meshing with a gear 6 on an axle 7 of the bridge.

The bridge carries a bin 8. A skip car 9 is raised by cables 10 connected to winding drums 11 and passing over pulleys 12 at the top of the bridge. The drums are driven through a gear train 13 by an electric motor 14. The skip car is adapted to raise batch containers 15 to a position above the bin 8 and empty their contents into the same, said car having wheels 16 and 17 which travel upon tracks 18 and 19 formed by angles. The upper portions of these tracks are arranged at such an angle to each other as to cause a tilting of the batch containers as illustrated in dotted lines in Figure 3.

Referring to Figures 7, 8 and 9, it will be seen that the skip car embodies a plurality of bars 9' having horizontal portions extending parallel to and slightly above the floor. The batch containers 15 are mounted on wheels 15' whereby they may be moved from the batch house into the furnace hall into proximity to the filling apparatus. The bottom of each batch container is supported by the wheels 15' of the container slightly above the level of the horizontal portions of the bars 9' whereby each container may be moved into position within the frame of the skip car as illustrated in Figures 7 and 9. When a container is so positioned, it may be secured to said car by passing a chain 15" around several of the spokes of each wheel 15' and engaging said chains with the sides of the car frame as illustrated in Figure 9. When the hoist is put in operation to raise the container, the bottom thereof will be supported on the horizontal portions of the bars 9'.

The bin is provided with opening and closing doors 20 geared together by intermeshing toothed segments 21 and operated by a handle 22 secured to one of said doors, whereby the material in the bin may be discharged into a ladle. Directly beneath the doors 20 is provided a deflector 23 to prevent the material from being spilled over the sides of the ladle.

The bridge 2 carries rails 24, extending at right angles to the ground rails 3, upon which runs a trolley 25. This trolley supports a turret 26 which may be revolved about a vertical axis, said turret having a pivot pin 27 journaled in a suitable bearing. Rotatably mounted in the turret is a shaft or spindle 28 on the outer end of which is fixed a ladle 29. The pivot pin 27 has its bearing in a member 30 of the trolley frame which is mounted to tilt about an axis 31 at one end and has a vertical screw threaded stem 32 carried by the trolley frame extending through the other end thereof. The upper side of the member 30 is engaged by a nut 33 on said stem adjustable by means of a wrench 33' mounted on the stem 32 and having a dog 33'' for engagement with said nut. By adjusting the nut 33 the turret may be angularly adjusted to raise or lower the ladle to the desired elevation with relation to an opening $a'$ and a pot $a^2$ in a furnace A.

Mounted on the lower end of the pivot pin 27 is a trailing arm 34 having at its rear end a downwardly extending stud 35 upon which is journaled a roller 36. By reference to Figures 3 and 4, it will be seen that there is provided between the rails 24 a straight section of guiding track 37 connected to the forward end of which is a switching track section 38. These track sections may conveniently be made of two spaced angles providing a channel therebetween. The roller 36 carried by the arm 34 is adapted to travel in the channels of these track sections, so that upon movement of the trolley inwardly towards a furnace, as long as roller 36 is in engagement with the straight track section 37, the spindle 28 will be maintained in longitudinal alignment with said straight section. When switch section 38 is deflected to one side or the other, roller 36 will follow the deflection, rotating pivot pin 27 correspondingly and thrusting the forward end of spindle 28 and the ladle 29 in the opposite direction, after the ladle has passed through an opening $a'$ into a furnace. This movement is for the purpose of locating the ladle over either of the two pots which are located to the right and to the left respectively of an opening $a'$, as shown in my patent above referred to.

Means is provided whereby the operator may readily shift the switch section 38 from one side to the other. This means comprises two parallel rock shafts 39 and 40 journaled in the bridge frame at opposite sides of the trolley and operatively connected by means of a connecting rod 41 pivoted at its opposite ends to rocker arms 42 secured to said rock shafts. The connecting rod is connected to the forward end of the switch section 38 by means of a link 43. The rock shaft 39 has an operating handle 44 secured thereto in convenient position to be manipulated by an operator standing upon an operator's stand 45.

The spindle 28 carries at its rear end a bevel gear 46 meshing with a gear segment 47 pivotally mounted upon the upper side of the turret, upon a pivot pin 27' in axial alignment with pivot pin 27, so as to be free to swing in a horizontal plane. The gear segment 47 has a downwardly extending integral flange 48 at its forward straight edge adapted to be engaged by stops 49 and 50 at the front and rear ends of the bridge. These stops are in the form of rollers carried on the ends of screw threaded stems 51 and 51'. The stems 51 are adjustably mounted in rocker arms 52 carried by the rock shafts 39 and 40, whereas the stems 51' are adjustably mounted in levers 52'. These levers are pivoted at 52'' to swing in a horizontal plane. Each of the levers has a stem 200 pivoted at one end thereto, said stem extending through an opening in a frame member 201 of the bridge and being surrounded by a coil spring 202 interposed between such frame member and the lever, a nut 203 being mounted on the threaded free end portion of said stem for cooperation with the frame member 201 to limit the movement of the lever by its spring. When the handle 44 is moved to shift the switch section 38 to the left, Figure 4, the stop 49 carried by the rock shaft 39 at the right hand side of the trolley will be raised into operative position with respect to the flange 48 and the stop 49 carried by the rock shaft 40 at the left hand side of the trolley will be lowered into inoperative position with respect to said flange.

Assuming the parts in the position shown in Figure 4, when the trolley is advanced to move the ladle 29 into the furnace, the ladle will be shifted to the right, by reason of the engagement of the roller 36 with switch section 38, and brought into operative position over the pot at the right hand side of the opening $a'$, the gear segment 47 being simultaneously swung to the left with the turret but not far enough to clear the right hand stop 49. Near the end of the forward movement of the trolley, the right hand stop 49 engages the flange 48 and rotates the gear segment 47 to the left about the pivot pin 27', thereby turning the ladle upside down to cause its contents to be emptied into the pot over which it is positioned. Upon rearward movement of the trolley the ladle comes out of the furnace upside down, but near the end of the rearward movement of the trolley the right hand stop 50 engages the flange 48 and rotates gear segment 47 back to normal position, thereby causing the ladle to be rotated into its rightside up position. It will be readily apparent that when the switch section 38 is shifted to the right, the left hand stop 49 will be moved upwardly into operative position with respect to the flange 48 and the right hand stop 49 lowered into inoperative position with respect to said flange, the left hand stops 49 and 50 cooperating with the flange 48 to rotate the ladle to empty its contents into the left hand pot and thereafter rotate it to bring it into rightside up position again after the ladle has been withdrawn from the furnace. There is a decided advantage in giving the ladle only a half revolution inside the furnace and bringing it out of the furnace upside down, because, where the ladle is turned rightside up inside the furnace, there is a tendency to knock off some of the batch which is piled in the pot and there is also the danger of particles of clay dropping into the ladle during its withdrawal from the furnace. It will be understood that in filling the right hand pot the ladle is turned in a counterclockwise direction, whereas it is turned in a clockwise direction in filling the left hand pot. In other words, the ladle is turned in a direction reverse to its direction of travel towards the pot. This is desirable because it facilitates emptying of the ladle without spilling some of the contents thereof outside the pot.

In order that the ladle 29 may be properly positioned to enter the opening $a'$ and that it may not scrape off the batch that may already be in the pot, it is raised just before it enters the furnace. This is accomplished by giving the forward ends of the rails 24 an upward inclination, as will be apparent by reference to Figure 1.

After the ladle is inverted inside the furnace to empty its contents into a pot it is desirable to maintain it in a truly horizontal position while being withdrawn in the inverted position from the furnace in order to prevent it striking against the edges of the furnace opening. It is equally desirable to maintain this ladle in a truly horizontal righted position when being filled and while being moved into the furnace into position over a pot in order to prevent the batch from being spilled over the sides of the ladle or to prevent premature dumping of the ladle. For this purpose an automatic stop is provided. This stop comprises a disk or head 204 keyed upon the extreme rear end of the ladle spindle 28 and having on its otherwise circular periphery diametrically opposite flat surfaces 205. Carried by and projecting rearwardly from the rear end of the turret 26 is a pair of parallel brackets 206 upon the free ends of which are fixed two vertical guide bars 207. Each of these bars is provided with a pair of spaced slots to receive one end of a pair of horizontal cross bars 208 for cooperation with the flat peripheral surfaces 205 of the disk 204. Heavy coil springs 209 connect the cross bars 208 and maintain said bars in frictional engagement with the periphery of said disk. The lock described permits rotation of the ladle spindle 28 by the gear segment 47 but automatically locks the same with the ladle either in inverted or righted position.

Mounted upon the forward end of the turret 26 is a bar 210 having a stop screw 211 extending through each end thereof and adjustable by means of lock nuts 212. These adjustable stops are positioned to cooperate with the flange 48 of the gear segment to limit rotation of said segment by reason of its engagement with the stops 49 when the ladle enters the furnace. In other words, when the right hand stop 49 engages the flange 48 to rotate the segment 47 and effect inversion of the ladle, the left hand stop 211 limits rotation of the segment and, vice versa, whereby the ladle is quickly brought to a state of rest in the inverted position. These steps, however, are not essential, particularly when sufficiently heavy springs 209 are provided.

When the ladle is moved out of the furnace and righted by reason of the engagement of one of the rear stops 50 with the flange 48, the other stop 50 cooperates with the flange 48 to limit rotation of the gear segment 47 and quickly bring the ladle to a state of rest in the righted position, the stops 50 functioning for this purpose in substantially the same manner as the stops 211, except that the stops 50 are yieldingly mounted.

The trolley 25 is given a reciprocating motion by means of a motor 53. This motor drives, through a gear train 54, a shaft 55. The latter has mounted at one end thereof a crank wheel 56 connected by a connecting rod 57 with a rocker arm 58 carried upon the end of a rock shaft 59. The rock shaft 59 carries two depending rocker arms 60 positioned at opposite sides of the trolley and connected by links 61 with the opposite ends of a bar 62 secured to the rear end of the trolley frame.

The operator's platform or cage 45 is located in a convenient position for the operation of the handles 22 and 44 therefrom and carries the necessary controllers and switching apparatus for the control of the several motors.

The control for the motor 53 is specially arranged with the object of giving the ladle as fast a movement as possible when entering and returning from the furnace. This is desirable so that the work of filling can be done in as short a time as possible, also for the reason that the ladle should return from the furnace in the least possible time to prevent its becoming so hot as to be burned. The ladle, however, at the end of its stroke into the furnace, must be retarded to a slight extent to check the inertia of the trolley and to prevent the flange 48 of the gear segment from hitting one of the stops 49 too hard. This is accomplished in part by the crank wheel 56 passing over the dead point and imparting to the arms 60 through the rocker arms 58 and the connecting rod 57 the minimum of angular motion at each end of the travel of the arms 60 and causing the trolley to slow down at each end of its travel.

This slowing down of the movement of the trolley is especially desirable at the end of its outward travel in order that the operator may fill the ladle from the bin without stopping the movement of the trolley, for which purpose the ladle must nearly come to a stop and remain under the bin charging opening for an appreciable length of time. The inertia of the trolley and other moving parts, however, prevents an effective slowing up at each end of the trolley travel, more especially due to the trolley running down the inclined rails 24.

It is necessary therefore to so control the motor 53 as to effect a slowing down of the trolley at the end of the stroke toward the furnace and a greater retardation thereof when it is under the bin charging opening. This is accomplished by means of cutting resistance into the armature circuit and further shunting the current across the motor armature so that the motor acts as a generator producing the effect known as dynamic breaking.

The motor 63 is preferably of the series type which has the characteristic of accelerating when the starting resistance is removed from the electric circuit and continuing to accelerate when the load is light and constant. The electrical control for the motor is shown by the wiring diagram, Figure 10, by reference to which it will be seen that power is supplied to the motor from lines L and L' through a main switch 63. The controller is of the drum type and is adapted to reverse the motor, a development of the cylinder contacts together with the stationary contacts cooperating therewith being shown in the diagram.

The main motor circuit is interrupted by a switch 64 adapted to be closed to complete the circuit, either for forward or reverse driving of the motor. The switch 64 is adapted to be closed by a magnet coil 65.

The circuit for energizing the magnet coil 65 comprises a conductor 66 tapped from the line L and leading to a stationary contact 67 of the controller. This contact is adapted to be connected by a bridge contact 68 on the controller cylinder with a stationary contact 69. The latter is connected by a conductor 70 with the magnet coil 65, and said coil is connected by a conductor 71 with a conductor 72 through a switch 73. The conductor 73 is connected to a conductor 74 leading to the line L'.

From the above description, it will be apparent that when the controller cylinder is shifted to the right, the bridge contact 68 will connect the stationary contacts 67 and 69 and thereby complete the circuit just described to the magnet coil 65. This will energize said coil and cause it to close the switch 64, thereby completing the circuit to the motor 53 to cause the latter to be driven in a forward direction. The motor circuit is from L through conductor 66 to fixed contact 67, the latter being connected to a fixed contact 75 through a bridge contact 76 on the controller cylinder. From the fixed contact 75 the circuit is continued through a conductor 77 to one side of the motor armature. From the other side of said armature a conductor 78 leads to a conductor 79 connected with the motor field 80. The conductor 79 has a solenoid 81 interposed therein for releasing a brake 53' on the motor armature shaft. (Figure 3). From the field 80 the motor circuit is continued through a conductor 82 to a fixed contact 83 adapted to be connected by cylinder contacts 84 and 85 with a fixed contact 86. The circuit is completed from the latter contact through a conductor 87, having a starting resistance 88 therein, switch 64 and conductor 74, the latter connecting with the line L'.

When the controller is operated to close the motor circuit, another circuit is completed from line L through conductor 66, stationary contact 67, bridge contact 68, fixed contact 69, conductor 70, conductor 89, limit switch S', conductor 90, magnet coil 91, conductor 92, and conductor 74, back to line L'. When the coil 91 is energized it opens a switch 93 in a shunt circuit leading across the motor armature from fixed contact 75 through conductor 94, resistance 95, and switch 93, to conductor 78.

In addition to the above, still another circuit is completed when the controller is operated. The switch 64 is operatively connected with a switch 96, a spring 97 maintaining said switches open when the motor is not running. When the coil 65 is energized, it simultaneously closes both switches 64 and 96, thereby completing a circuit from line L through conductor 89, limit switches S' and S², conductor 98, solenoid 99, conductor 100, switch 96, conductor 101, and conductor 74, back to line L'. The plunger of the solenoid 99 has a dash pot 102 at its lower end and at its upper end is connected to a lever 103 carrying contact 104, 105 and 106 adapted to engage cooperating contacts 104', 105' and 106' to gradually cut out starting resistance 88, as the plunger of the solenoid is raised, by short-circuiting the same through conductor 107, lever 103 and conductor 108. Simultaneously with the short-circuiting of the resistance 88, the switch 73 is opened, thereby causing all of the current in the circuit of magnet coil 65 to pass through a resistance 109 and consequently diminishing the amount of current flowing in said circuit, a heavier flux being required in said coil to close the switches 64 and 96 than to maintain them closed.

In order to reverse the motor, the controller cylinder is moved to the left. The main motor circuit is then from L through conductor 66, fixed contact 67, cylinder contacts 110, 68 and 76, fixed contact 111, conductor 82, field 80, conductors 79 and 78, to the motor, thence through conductor 77, fixed contact 75, cylinder contact 84, fixed contact 86, conductor 87, starting resistance 88, switch 64, and conductor 74, back to line L'.

The limit switch S' is placed at the rear end of the bridge and the limit switch $S^2$ at the front end thereof. These switches are adapted to be opened by contact with the trolley as the latter approaches the end of its path of travel in either direction. As the trolley approaches the end of its movement towards the furnace, the limit switch $S^2$ is opened. This breaks the circuit through the solenoid 99, allowing the contacts 104, 105 and 106 to drop out of engagement with the contacts 104', 105' and 106', and thereby putting the starting resistance 88 in series with the motor. The latter is consequently caused to slow down. After the trolley changes its direction of motion and begins to move away from the furnace, the limit switch $S^2$ is disengaged by the trolley, and immediately closes, thereby re-making the circuit through the solenoid 99 and short-circuiting the resistance 88. The motor then speeds up until the trolley approaches the end of its movement away from the furnace, when the trolley engages the limit switch S' and opens the same. Opening of the limit switch S' not only breaks the circuit through the solenoid 99, thereby putting the starting resistance 88 in the motor circuit, but also breaks the circuit through magnet coil 91, thereby permitting the switch 93 to close and complete the circuit through the resistance 94, shunting the latter across the motor armature. This results in slowing the motor down even more than when the limit switch $S^2$ is open, due to dynamic breaking, and causes the ladle to remain for an appreciable interval of time under the charging opening of the bin, whereby the operator is enabled to fill the ladle from the bin without stopping the motor. When the trolley reverses its direction of movement and begins to move towards the furnace, the limit switch S' is released and the circuits through the solenoid 99 and magnet coil 91 are again completed, thereby cutting the resistances 88 and 94 out of the motor circuit and enabling the motor to speed up. A push button 112 is provided for short-circuiting the limit switches S' and $S^2$ so that the motor may be started from a dead stop while the trolley is in contact with and holding either one of said switches open.

The operation of the apparatus may be briefly summarized as follows: The batch containers 15 are brought to the apparatus and put on the skip car frame 9 and the motor 14 operated to lift said containers to the top of the bridge and dump them into the bin 8. The bridge having been moved by motor 4 to position the trolley opposite an opening a' of a furnace, and said trolley having been moved to a position such that the ladle 29 is under the doors 20 of the bin, the operator fills the ladle with the batch by operating the handle 22. He then operates the handle 44 to set the switch section 38 in the desired position and operates the controller to start the motor 53, holding the push button 112 depressed until the trolley has moved out of contact with the limit switch S'. The trolley moves forward, carrying the ladle into the furnace into position over the pot at one side of the opening a'. As the ladle comes into position over the pot it is automatically turned upside down to empty the batch into the pot by reason of the engagement of a stop 49 with the flange 48 on the gear segment 47. The trolley then reverses its direction of movement and carries the ladle out of the furnace in an inverted position, in which position it remains until the trolley is near the end of its travel away from the furnace, when it is turned rightside up by reason of the engagement of a stop 50 with the flange 48. As the trolley slows up near the end of its travel away from the furnace the operator will again fill the ladle from the bin. After several ladles of material have been dumped into the pot the motor 53 is stopped and the handle 44 is operated to set the switch section 38 in position for filling the pot at the other side of said opening. The operator then starts the motor 53 and the trolley is again continuously moved towards and away from the furnace for filling the other pot, slowing up near the end of its travel in either direction, until the operator operates the controller to stop the motor. After the first pair of pots has been filled the motor 53 is stopped, bringing the ladle to rest away from the furnace. The motor 4 will then be started and the bridge moved to bring the trolley opposite the next furnace opening and the pots within that opening filled in the same way as described for the first pair, and so on for each succeeding pair of pots. It will be seen that for any one pot the filling operation is carried on continuously without stopping the motor 53. This enables an increased output to be obtained and reduces the amount of manual labor required for the handling of the apparatus to a minimum.

An important advantage of the present invention arises from the provision of a pot filling apparatus adapted to be continuously operated for the filling of each pot.

Another advantage of the invention arises from the provision of a ladle carrying trolley having power means associated therewith adapted to continuously move said trolley towards and from a furnace, together with means for causing said trolley to move at a relatively slow speed over the end portions of its path of travel and to accelerate over the intermediate portion thereof.

A further advantage of the invention arises from the provision of means for automatically inverting the ladle after it enters a furnace and automatically righting it after it comes out of the furnace in combination with an automatic stop for holding the ladle both in its inverted and in its righted position.

I claim:

1. Pot filling apparatus, comprising a traveling carriage adapted to be moved along in front of a furnace, a batch-supply receptacle carried by said carriage, a ladle support mounted in said carriage for movement towards and from a furnace, a ladle carried by said support and adapted to receive a batch from said receptacle, a batch container supported on wheels whereby it can be moved from a filling station to said carriage, and means carried by said carriage for elevating said container from the ground level into dumping position with respect to said receptacle and automatically dumping its contents into said receptacle, substantially as described.

2. Pot filling apparatus, comprising a traveling carriage adapted to be moved along in front of a furnace, a batch-supply receptacle carried by said carriage, a ladle support mounted in said carriage for movement towards and from a furnace, a ladle carried by said support and adapted to receive a batch from said receptacle, and a batch container supported on wheels whereby it can be moved from a filling station to said carrier, said carriage having a skip car travelling on tracks on said carriage for elevating said container from the ground level to a point above said receptacle and then automatically tilting the same to empty its contents into said receptacle, substantially as described.

3. Pot filling apparatus, comprising a traveling carriage adapted to be moved along in front of a furnace, a ladle support mounted in said carriage for movement towards and from a furnace, a spindle journalled in said support, a ladle carried by said spindle, a pinion fixed to said spindle, a gear segment pivoted to said support and cooperating with said pinion, stops carried by the carriage for cooperation with said segment for automatically inverting said ladle as said support approaches the limit of its movement towards the furnace and for automatically righting it as said support approaches the limit of its movement away from the furnace, and automatic means cooperating with said spindle for yieldingly holding said ladle in either of said positions until moved into the other of said positions, substantially as described.

4. Pot filling apparatus, comprising a traveling carriage adapted to be moved along in front of a furnace, a ladle support mounted in said carriage for movement towards and from a furnace, a ladle carried by said support and adapted to be inverted for emptying its contents into a pot and to be righted to receive a batch, and automatic means for yieldingly holding said ladle in both of said positions, substantially as described.

5. Pot filling apparatus, comprising a traveling carriage adapted to be moved along in front of a furnace, a ladle support mounted in said carriage for movement towards and from a furnace, a ladle carried by said support and adapted to be inverted for emptying its contents into a pot and to be righted to receive a batch, and automatic means for yieldingly holding said ladle in one of said positions, substantially as described.

6. Pot filling apparatus, comprising a traveling carriage adapted to be moved along in front of a furnace, a ladle support mounted in said carriage for movement towards and from a furnace, a ladle carried by said support, means for automatically inverting said ladle as said support approaches the limit of its movement towards the furnace and for automatically righting it as said support approaches the limit of its movement away from the furnace, and automatic means effective to hold said ladle in either of said positions until moved into the other of said positions by said first mentioned means, substantially as described.

7. Pot filling apparatus, comprising a traveling carriage adapted to be moved along in front of a furnace, a transverse trackway supported by said carriage, a trolley mounted on said trackway and provided with a bearing, a spindle rotatably mounted in said bearing and provided with a charging ladle, means for automatically inverting said ladle as said trolley approaches the limit of its movement towards the furnace and for automatically righting it as said trolley approaches the limit of its movement away from the furnace, and automatic means cooperating with said spindle for yieldingly holding said ladle in either of said positions until moved into the other of said positions by said first mentioned means, substantially as described.

8. Pot filling apparatus, comprising a traveling carriage adapted to be moved along in front of a furnace, a transverse trackway supported by said carriage, a trolley mounted on said trackway and provided with a substantially horizontal bearing rotatable about a substantially vertical axis, a spindle rotatably mounted in said bearing and provided with a charging ladle, means for automatically deflecting the ladle laterally after it enters the furnace, means for automatically inverting the ladle after it enters the furnace and automatically righting it after it leaves said furnace, and automatic means cooperating with said spindle for yieldingly holding said ladle in either of said positions until moved into the other of said positions by said first mentioned means, substantially as described.

9. Pot filling apparatus, comprising a traveling carriage adapted to be moved along in front of a furnace, a transverse trackway supported by said carriage, a trolley mounted on said trackway and provided with a bearing, a spindle rotatably mounted in said bearing and provided with a charging ladle, a pivotally mounted gear segment, a pinion carried by said spindle and meshing with said gear segment, a stop for cooperation with said gear segment during the latter portion of the movement of said trolley towards the furnace for automatically inverting the ladle, a stop for cooperation with said gear segment during the latter portion of the movement of said trolley away from the furnace for automatically righting said ladle, and automatic means for yieldingly holding said ladle in either of said positions until moved into the other of said positions by the cooperating stop, substantially as described.

10. Pot filling apparatus, comprising a trackway, a trolley supported on said trackway and carrying a charging ladle, power means for reciprocating said trolley along said trackway, and speed controlling means associated with said power means for causing said trolley to travel at a relatively slow speed over the end portions of its path of travel and to accelerate over the middle portion of said path, substantially as described.

11. Pot filling apparatus, comprising a trackway, a trolley supported on said trackway and carrying a charging ladle, power means for reciprocating said trolley along said trackway, and speed controlling means associated with said power means for causing said trolley to travel at a relatively slow speed over the end portions of its path of travel and to accelerate over the middle portion of said path, said speed controlling means causing said trolley to travel over one of said end portions at a slower speed than over the other of said end portions, substantially as described.

12. Pot filling apparatus, comprising a trackway, a trolley supported on said trackway and carrying a charging ladle, an electric motor operatively connected to said trolley and adapted to continuously reciprocate the same over said trackway, and means for automatically varying the speed of said motor to thereby cause it to move said trolley at different speeds over different portions of its path of travel, substantially as described.

13. Pot filling apparatus, comprising a carriage, a trackway supported by said carriage, a batch-supply receptacle supported over said trackway, a trolley supported on said trackway, power means for reciprocating said trolley over said trackway, a ladle carried by said trolley and adapted to be brought under the charging opening of said receptacle during the latter portion of the movement of said trolley in one direction and to be thrust into a furnace during the latter portion of the movement of said trolley in the opposite direction, and speed regulating means associated with said power means for slowing down said trolley during the said latter portions of its movement in opposite directions, substantially as described.

14. Pot filling apparatus, comprising a traveling carriage adapted to be moved along in front of a furnace, a transverse trackway supported by said carriage, a trolley mounted on said trackway and provided with a substantially horizontal bearing rotatable about a substantially vertical axis, a spindle rotatably mounted in said bearing and provided with a charging ladle, means including a shiftable track section for automatically shifting said ladle laterally to one side or the other after it enters a furnace, means including a pair of stops positioned on each side of the path of travel of said trolley for automatically inverting said ladle after it enters the furnace and for automatically righting it after it leaves the furnace, means for moving a stop on one side of said trolley into operative position and simultaneously moving the corresponding stop on the other side of said trolley into inoperative position, and vice versa, and means operatively connecting said switch track section with said stop operating means whereby movement of one stop into operative position simultaneously effects movement of said switch track section into one operative position and movement of the other stop into operative position simultaneously effects movement of said switch track section into another operative position, substantially as described.

15. Pot filling apparatus, comprising a trackway, a trolley supported on said trackway and carrying a charging ladle, an electric motor operatively connected to said trolley and adapted to continuously reciprocate the same over said trackway, and limit switches adapted to be held open by said trolley during movement of the same over the end portions of its path of travel whereby to vary the resistance in the motor circuit to lessen the speed of said motor and whereby to effect dynamic braking of the motor during movement of the trolley over one of said end portions of its path of travel, substantially as described.

16. Pot filling apparatus, comprising a trackway, a trolley supported on said trackway and carrying a charging ladle, power means for continuously reciprocating said trolley along said trackway, and speed controlling means associated with said power means for causing said trolley to travel at a slower speed over one end portion of its path of travel than over the middle portion of said path, substantially as described.

17. The combination with a furnace, of a trackway in front of said furnace, a bridge supported on said trackway, a motor carried by said bridge for moving the same along said trackway, a transverse trackway carried by said bridge, a batch-supply receptacle supported over said trackway, a trolley mounted on said trackway, a motor carried by said bridge and adapted to continuously reciprocate said trolley over said trackway, a ladle carried by said trolley and adapted to be brought under the charging opening of said receptacle during the latter portion of the movement of said trolley away from the furnace, and means for automatically reducing the speed of said trolley actuating motor while said trolley is traveling over the end portion of its path of movement away from the furnace, substantially as described.

18. Pot filling apparatus, comprising a trackway, a trolley supported on said trackway and carrying a charging ladle, a batch-supply receptacle supported over said trackway, power means for reciprocating said trolley along said trackway, and speed controlling means associated with said power means for causing said ladle to remain for an appreciable length of time under the charging opening of the batch-supply receptacle without actual stopping of said motor, substantially as described.

19. Pot filling apparatus, comprising a trackway, a trolley supported on said trackway, a batch-supply receptacle supported over said trackway, power means for continuously reciprocating said trolley along said trackway, a ladle carried by said trolley and brought under the charging opening of said receptacle at the end of travel of the trolley in one direction, and speed controlling means associated with said power means for causing said trolley to accelerate over the middle portion of its path of travel and to slow down sufficiently when said ladle is brought under said charging opening to cause said ladle to remain under said opening for an appreciable length of time, substantially as described.

In testimony whereof I have hereunto set my hand.

JAMES W. CRUIKSHANK.